Feb. 19, 1935.    H. V. LUDWICK    1,992,079
SAFETY ATTACHMENT FOR WHEELS
Filed March 21, 1934
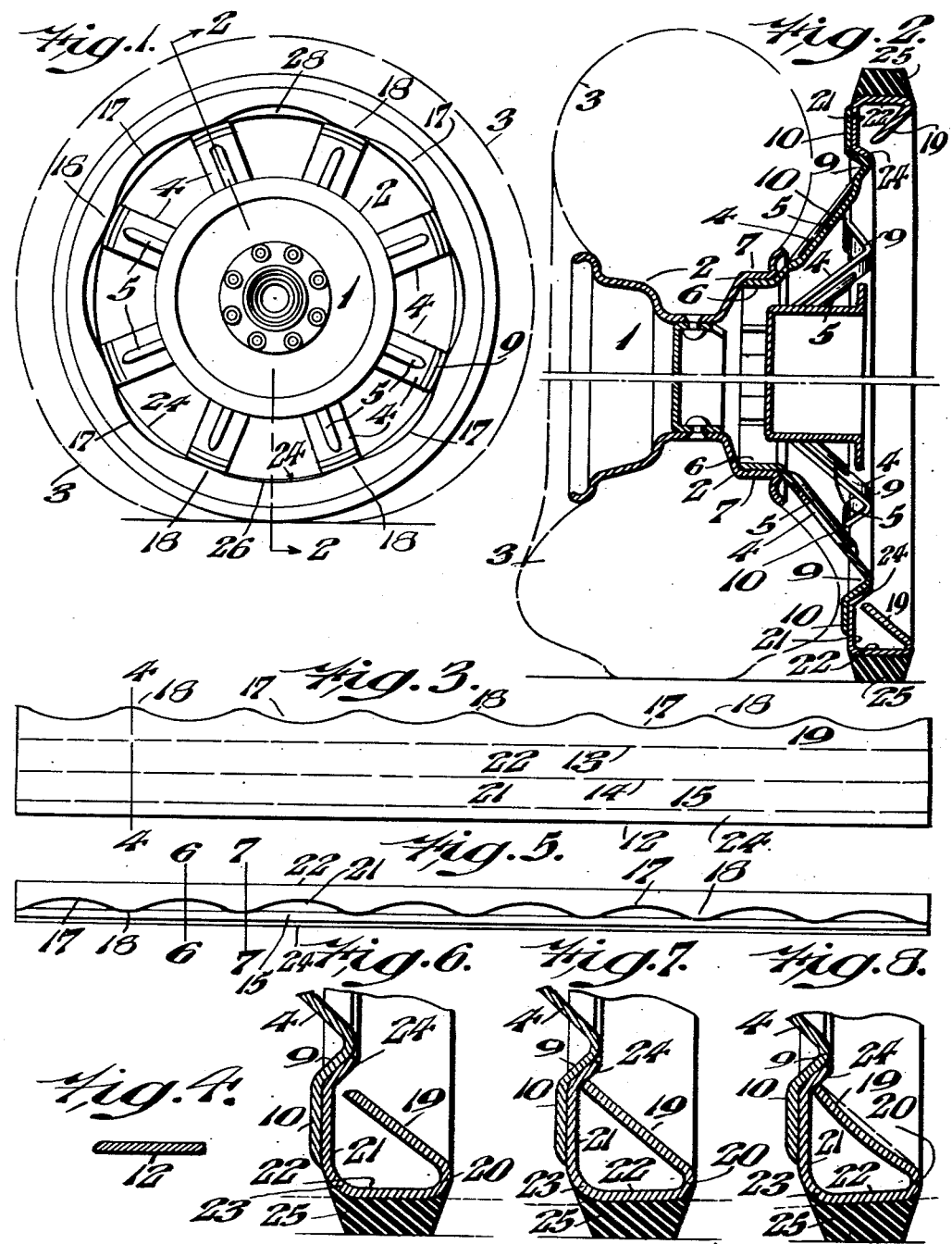
INVENTOR
HERBERT V. LUDWICK
BY
Louis Nicho
ATTORNEY Patented Feb. 19, 1935

1,992,079

UNITED STATES PATENT OFFICE 1,992,079

SAFETY ATTACHMENT FOR WHEELS

Herbert V. Ludwick, Dearborn, Mich., assignor to American Tire Guard Company, Detroit, Mich., a corporation of Michigan Application March 21, 1934, Serial No. 716,590

2 Claims. (Cl. 301—39)

My invention relates to a new and useful safety attachment for wheels, and more particularly for wheels of automotive vehicles, whereby the danger of injury resulting from a blow-out or a sudden deflation of a pneumatic tire is greatly minimized or entirely eliminated and whereby the overheating of the tires on the wheels of vehicles with the resultant increase of danger of a blow-out and the attendant detrimenal effect upon the pneumatic tires is prevented.

My invention still further relates to an attachment of this character, the construction of which combines a sufficient amount of resiliency to permit of adequate absorption of a normal load, and which is further capable of assuming the characteristics of a rigid, highly reinforced and self-locking member to withstand any excess load to which it may be subjected over and above the range of resilient absorption inherent in the structure.

My invention still further relates to an attachment of this character which embodies the advantages derived from the resiliency inherent in bridge construction, the resilient load absorbing member of my attachment being segmentally bridged along the circumference of the attachment to produce closely alternating points of resiliency and rigidity, producing a continuous resilient effect when the wheel is in motion and nevertheless affording the necessary rigidity under conditions of excessive load.

My invention still further relates to an attachment of this character, which, due to the paricular features of construction hereinabove stated and hereinafter more fully described, is capable of being manufactured from a relatively light gage steel at a relatively low cost of production.

My invention still further relates to an attachment of this character which is easily applicable to any form of conventional wheel construction, without any material or undue interference with or alteration of such wheel construction to render the device equally applicable to wheels already in use, as well as to wheels of future manufacture.

My invention still further relates to a novel method of manufacturing and assembling my novel attachment for application to a wheel whereby great economy in the consumption of the metal of which the attachment is made is effected and whereby the manufacturing steps necessary to complete the product are greatly minimized and facilitated.

My invention still further relates to a novel method of manufacturing the attachment referred to whereby the resultant product is rendered easily applicable to a conventional wheel in use with practically no material interference or alteration of the structure of said conventional wheel.

In the accompanying drawing:

Fig. 1 represents a side elevation of a wheel provided with a safety attachment embodying my invention.

Fig. 2 represents, on an enlarged scale, a section on line 2—2 of Fig. 1, the conventional structure of the body of the wheel being omitted to permit enlargement of the parts constituting the invention.

Fig. 3 represents a plan view illustrating the first step in the manufacture of the safety attachment embodying my invention.

Fig. 4 represents a section on line 4—4 of Fig. 3.

Fig. 5 represents a plan view of the strip shown in Fig. 3 after the latter has been formed.

Fig. 6 represents a section, on an enlarged scale, on line 6—6 of Fig. 5 showing the formed strip of Fig. 5 secured to the rim of a wheel.

Fig. 7 is a view similar to Fig. 6 on line 7—7 of Fig. 5.

Fig. 8 is a view similar to Figs. 6 and 7 illustrating the reaction of the attachment under excessive load.

Referring to the drawing in which like reference characters indicate like parts, 1 designates the hub of a wheel and 2 the rim thereof which carries the pneumatic tire 3. The parts heretofore described are conventional and form no part of the invention.

My novel attachment is composed, generally speaking, of a series of reinforced auxiliary spokes, which are secured at suitable peripheral intervals to the rim 2, and of an auxiliary circular rim or member of a generally triangular cross section secured to the outer ends of said spokes, my novel invention further residing in the novel method of forming and assembling said spokes and said auxiliary rim or member with respect to each other and to the wheel. The spokes 4 are provided with the reinforced ribs 5 and are of a generally dished contour having the rectilinear portion 6 thereof secured to the portion 7 of the rim 2 and having formed therein a bead 9 which merges into or terminates in a rectilinear annular portion 10. The auxiliary rim member forming the other part of my invention consists of a flat strip 12, best shown in Figs. 3 and 4, which is folded upon itself along the lines 13, 14 and 15 to form the triangular cross sectional shape best seen in Figs. 2 and 6 to 8. One longitudinal edge of the strip 12 is scalloped or cut into arcuate segments 17 which are separated by what may be called contact or abutment rounded areas 18. The portion 19 is bent over the rest of the strip along the line 13 forming the rounded corner 20 of the desired angle and the section 21 of the strip is bent with respect to the intermediate section 22 along the line 14 into a substantially vertical position and forms the rounded corner 23. The narrow portion 24 is then bent at a slight angle to the vertical portion 21 to form an abutment for the edge of the portion 19 and also to abut against one side of the bead formed in the spoke 4. The rectilinear horizontal portion 22 of the auxiliary rim forms the tread thereof and is preferably provided with a solid rubber tire 25 or its equivalent. The auxiliary rim comprising the parts 19, 21, 22 and 24 is then welded, or otherwise suitably secured, to the outer ends of the spokes 4 with the vertical wall 21 and bent portion 24 abutting against the vertical portion 10 and the bead 9 of the spokes 4, as best seen in Figs. 2 and 6 to 8. The arcuate segments 17 thus abut against and are secured to the various spokes 4 along their rounded contact areas 18, so that each arcuate segment between each pair of contact areas 18 is in the nature of a bridge-like construction and hence possesses a certain degree of resiliency derived from its structure in addition to whatever resiliency may be inherent in the particular kind of steel employed. When the tire 3 is deflated and the weight or load falls upon the auxiliary rim the cushioning tire 25 absorbs the preliminary effects of the shock and the remainder of the load, as well as shock of impact, is gradually absorbed by the tendency of the angular member 19 to move towards the bent portion 24 of the auxiliary rim, as shown at 26 in Fig. 1 where the edge of the angular wall 19 is shown as very close to but not quite contacting the deflected portion 24. The auxiliary rim is made of a gage of steel having an index of tensile strength and resiliency sufficient to support any load within a certain range and to absorb the shock of impact of such a load being thrust suddenly upon the rim. If the auxiliary rim is subjected to a load over the range for which it is designed, the edge of the inclined member 19 will abut against the inclined portion 24 which in turn is reinforced by the beads 9 on the spokes 4. In this position the inclined member 19 interlocks with the inclined portion 24 in accordance with the lines of force exerted thereon and forms a rigid construction of a triangular cross section. If the load to which the auxiliary rim is subjected is still in excess of the amount necessary to interlock the wall 19 with the portion 24, the inclined member 19 tends to assume the slightly concaved position as best seen in Fig. 8, but in no event can the edge of the member 19 slip past the inclined portion against which it abuts in either direction. By comparing the dotted lines with the solid lines shown at the bottom of Figs. 6 to 8 it will be seen that in the process of compression the normally horizontal tread portion 22 tends to assume an inclined position as the angular member 19 of the auxiliary rim approaches the deflected portion 24 and the bead 9. When the load or impact to which the auxiliary rim is subjected is not in excess of the maximum for which it is designed the segmental portions 17 retain their initial structural resiliency and reassume the position shown at 28 in Fig. 1 when they are relieved of the load by the rotation of the wheel. The spokes 4 with their reinforcing ribs 5 afford rigid supports at intervals and the bridge-like segments 17 absorb the load in the intervals intervening between the spokes 4.

It will thus be seen that by my novel method of manufacture and assembly of the safety attachment herein described, or similar attachment embodying the foregoing advantages, a great saving in the consumption of metal used is effected, since the spokes 4 can be cut in the desired lengths from a continuous strip of the desired width and thickness with the ribs 5 shaped at intervals in the long strip before it is cut or in the spokes 4 after they are cut, with absolutely no waste of material, and similarly the strip 12 from which the triangular cross sectional tread member is formed is cut from a long strip of the desired width and thickness, the only waste involved in this step consisting of the narrow strips which are cut out to form the arcuate sections 17. In addition to the fact that the waste of material in cutting has been reduced to a minimum, it is also apparent that by this novel method of manufacture a construction of extremely light weight can be produced. Furthermore, in the event of breakage or damage to one of the spokes 4, for instance, the same can be sweated off and another spoke can be welded in place thereof.

It will also be seen that the spaced spokes 4, as well as the triangular cross sectional tread member, being secured to the pneumatic tire supporting rim 2 act as radiating surfaces to conduct heat from the rim and dissipate such heat, thereby further safeguarding against blow-outs, due to increased air pressure, as well as prolonging the life of the pneumatic tire. With an attachment of this character permanently carried by the wheel of the vehicle the danger attendant on loss of control, due to a blow-out at high speed, is greatly minimized or entirely eliminated due to the immediate substitution, for the pneumatic tire, of a tread for the wheel which is sufficiently resilient and sufficiently rigid to prevent uncontrolled skidding of the vehicle and at the same time to afford sufficient support until the vehicle can be brought to a stop and until the deflated pneumatic tire can be replaced or repaired.

With respect to the arcuate sections 17 which form the bridge-like construction above mentioned, I wish to point out that as long as the critical point of the index of resiliency has not been reached in terms of the load to which the attachment is subjected the bridge-like arcuate sections 17 between the contact points 18 will move towards the portion 24 and bead 9 under load, as shown at 26 in Fig. 1, and will "open" or resume the position shown at 28 in Fig. 1 when the pressure is relieved, thus affording a continuously resilient structure.

I claim:

1. A safety attachment for a vehicle wheel having a rim supporting a tire, comprising a plurality of spokes secured to said rim, and a separate auxiliary rim carried by said spokes, said rim being of triangular cross section and comprising an inner wall constituting the inner leg of the triangle, an outer wall constituting the outer leg of the triangle, and an intermediate base forming a tread, said outer wall abutting against said inner wall at intervals and being spaced therefrom intermediate its points of abutment.

2. A safety attachment for a vehicle wheel having a rim supporting a tire, comprising a plurality of spokes secured to said rim, each of said spokes having a bead formed near the outer end thereof, and a separate auxiliary rim carried by said spokes, said auxiliary rim being of triangular cross section and comprising an inner wall constituting the inner leg of the triangle, an outer wall constituting the outer leg of the triangle, and an intermediate base forming a tread, said outer wall abutting against said inner wall adjacent the beads formed in said spokes at intervals, and being spaced therefrom intermediate said points of abutment.

HERBERT V. LUDWICK.